No. 785,028. PATENTED MAR. 14, 1905.
R. M. VARNEDOE.
VINE CUTTER.
APPLICATION FILED DEC. 19, 1904.
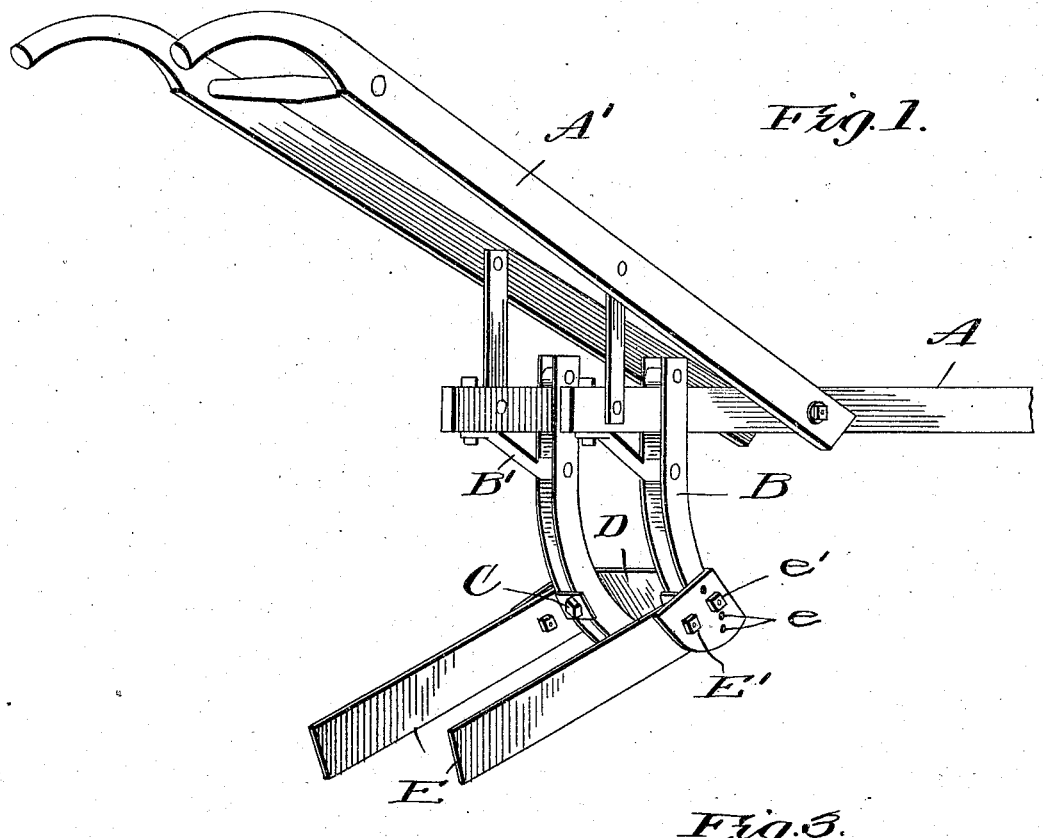
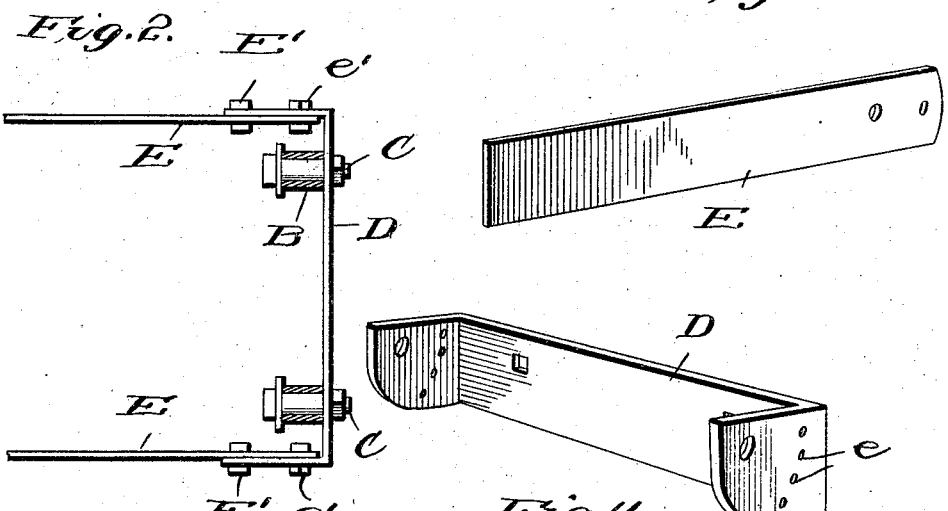

No. 785,028. Patented March 14, 1905.

UNITED STATES PATENT OFFICE.

ROBERT MALLARD VARNEDOE, OF THOMASVILLE, GEORGIA, ASSIGNOR OF ONE-HALF TO J. W. PEACOCK, OF THOMASVILLE, GEORGIA.

VINE-CUTTER.

SPECIFICATION forming part of Letters Patent No. 785,028, dated March 14, 1905.

Application filed December 19, 1904. Serial No. 237,570.

*To all whom it may concern:*

Be it known that I, ROBERT MALLARD VARNEDOE, a citizen of the United States, residing at Thomasville, in the county of Thomas and State of Georgia, have invented certain new and useful Improvements in Vine-Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in vine-cutters; and the object of the invention is to produce a simple and efficient device of this character which may be easily and quickly secured to single or double plow-stocks and arranged so that the blades may cut at different depths.

The invention consists in various details of construction and combinations and arrangements of parts, which will be hereinafter fully described and then specifically defined in the appended claims.

My invention is illustrated in the accompanying drawings, in which—

Figure 1 is a perspective view showing the device as applied to a plow-frame. Fig. 2 is a sectional view through the double stocks of the plow. Fig. 3 is a detail view of one of the blades, and Fig. 4 is a detail view of one of the blade-holding members.

Reference now being had to the details of the drawings by letter, A designates a plow-beam of the usual construction, having handles A' secured thereto.

B designates the plow-stocks, which are arranged in pairs and spaced apart, as shown in Fig. 1 of the drawings. Suitable braces B' are provided, which are held upon bolts passing through the walls of the stocks and their upper ends secured to the plow-beams.

D designates an angle-shaped bar forming a blade-holder, which is held to the plow-stock by means of bolts C, which pass between the stocks in the manner shown.

E designates the vine-cutting blades, which are mounted upon the pivots E', carried by the angle ends of the bar D. Said angle ends are provided with series of perforations $e$, and a pin $e'$, carried by each blade, is designed to engage one or the other of said perforations, whereby the cutting edge of said blade may be held at different inclinations.

By the provision of the device shown and described it will be observed that a simple mechanism is afforded for various purposes, as in cutting vines, &c., which may be readily adjusted to cut at different depths and easily applied to and removed from the beam of a plow.

While I have shown a particular construction of vine-cutting apparatus, it will be understood that I may vary the details of the same, if desired, without in any way departing from the spirit of the invention.

Having thus fully described my invention, what I claim as new, and desire to secure by Letters Patent, is—

1. A vine-cutting apparatus comprising a plow-beam, handles thereto, double plow-stocks secured to said beam, a bar having angled ends, bolts for fastening said bar to the front edges of said stocks, and cutting-blades adjustably mounted upon the angled ends of said bar, as set forth.

2. A vine-cutting apparatus comprising a plow-beam with handles thereto, plow-stocks secured to said beam, an angle-bar fastened to the front edges of said stocks and provided with series of perforations, cutting-blades pivotally mounted upon the angled ends of said bar, a pin carried by each of said blades and designed to engage one of the perforations in said bar, as shown and described.

In testimony whereof I hereunto affix my signature in presence of two witnesses.

ROBERT MALLARD VARNEDOE.

Witnesses:
J. L. MONTGOMERY, Jr.,
T. N. THORNTON.